United States Patent [19]

Stoychoff

[11] 4,175,598

[45] Nov. 27, 1979

[54] APPARATUS FOR FELLING AND ACCUMULATING TREES

[75] Inventor: Terry A. Stoychoff, Schofield, Wis.

[73] Assignee: J. I. Case Company, Racine, Wis.

[21] Appl. No.: 905,137

[22] Filed: May 12, 1978

[51] Int. Cl.² .......................................... A01G 23/08
[52] U.S. Cl. ................... 144/34 E; 144/3 D; 414/739
[58] Field of Search ............... 144/2 Z, 3 D, 34 R, 144/34 E, 309 AC; 214/3, 147 G; 294/106, 88

[56] References Cited

U.S. PATENT DOCUMENTS

| | | | |
|---|---|---|---|
| Re. 29,235 | 5/1977 | Kurelek | 144/34 E X |
| 3,468,352 | 9/1969 | Larson et al. | 144/34 E |
| 3,640,322 | 2/1972 | Allen | 144/34 E |
| 3,664,391 | 5/1972 | Coffey | 144/34 R |
| 3,749,143 | 7/1973 | Hamilton | 144/3 D |
| 3,785,415 | 1/1974 | Taponen | 144/34 R |
| 3,795,264 | 3/1974 | Coughran, Jr. | 144/34 R X |
| 3,805,860 | 4/1974 | Smith | 144/309 AC X |
| 3,910,326 | 10/1975 | Tucek | 144/34 R |
| 3,911,981 | 10/1975 | Tucek | 144/34 E X |

Primary Examiner—Robert Louis Spruill
Assistant Examiner—W. D. Bray
Attorney, Agent, or Firm—Dressler, Goldsmith, Clement, Gordon & Shore, Ltd.

[57] ABSTRACT

A tree with a harvester head includes a frame having a cutting area defined thereon and an accumulator area adjacent the cutter area with accumulator arms on the frame for holding the trees in the accumulator area and grapple arms for gripping a growing tree between the accumulator arms and the grapple arms. The arms are arranged such that the growing tree can be gripped between the closed accumulator arms and grapple arms during the cutting operation and then the accumulator arms can be opened to allow the grapple arms to automatically move the severed tree into the accumulator area in which it is then retained by the accumulator arms.

6 Claims, 6 Drawing Figures

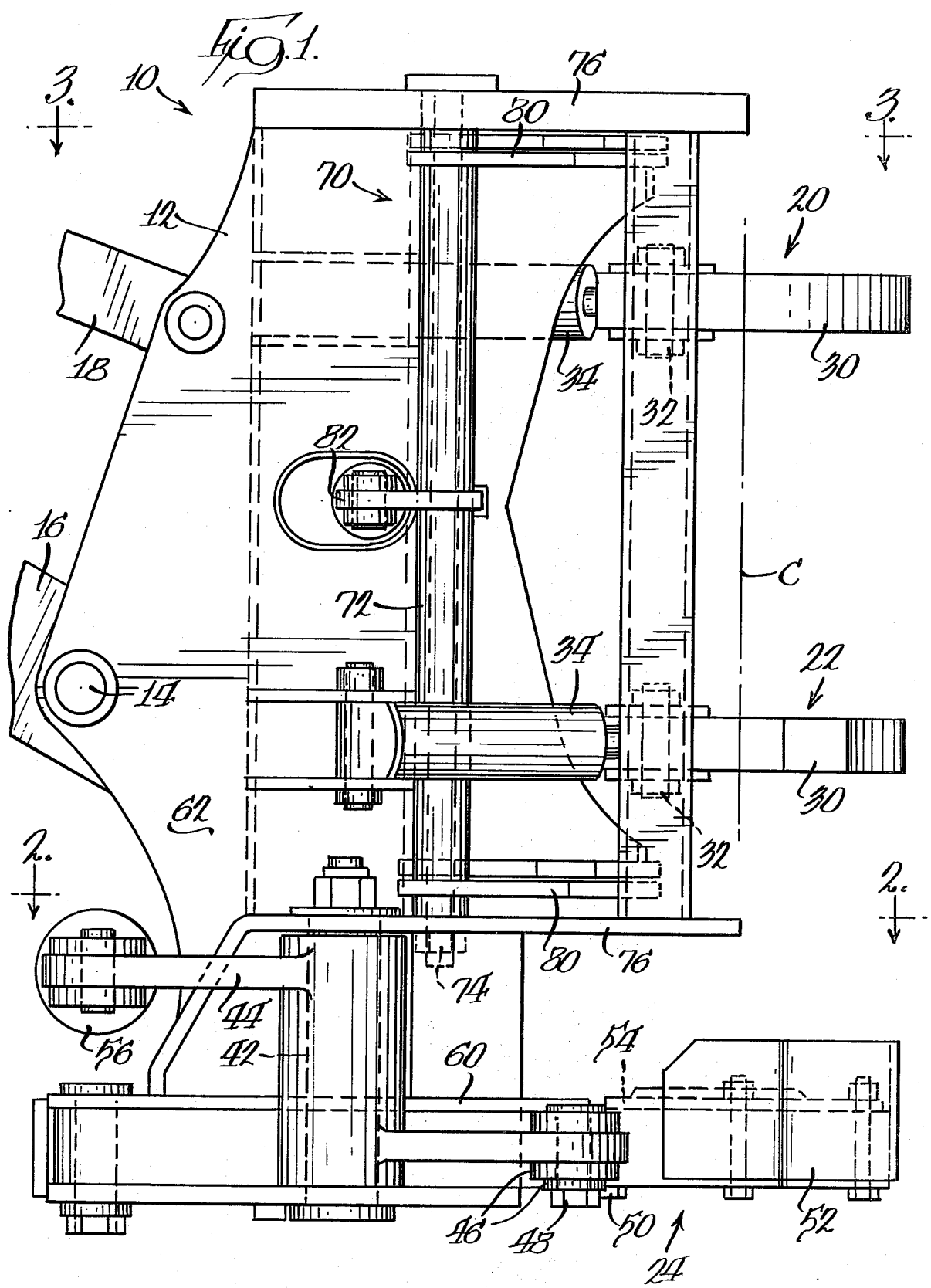

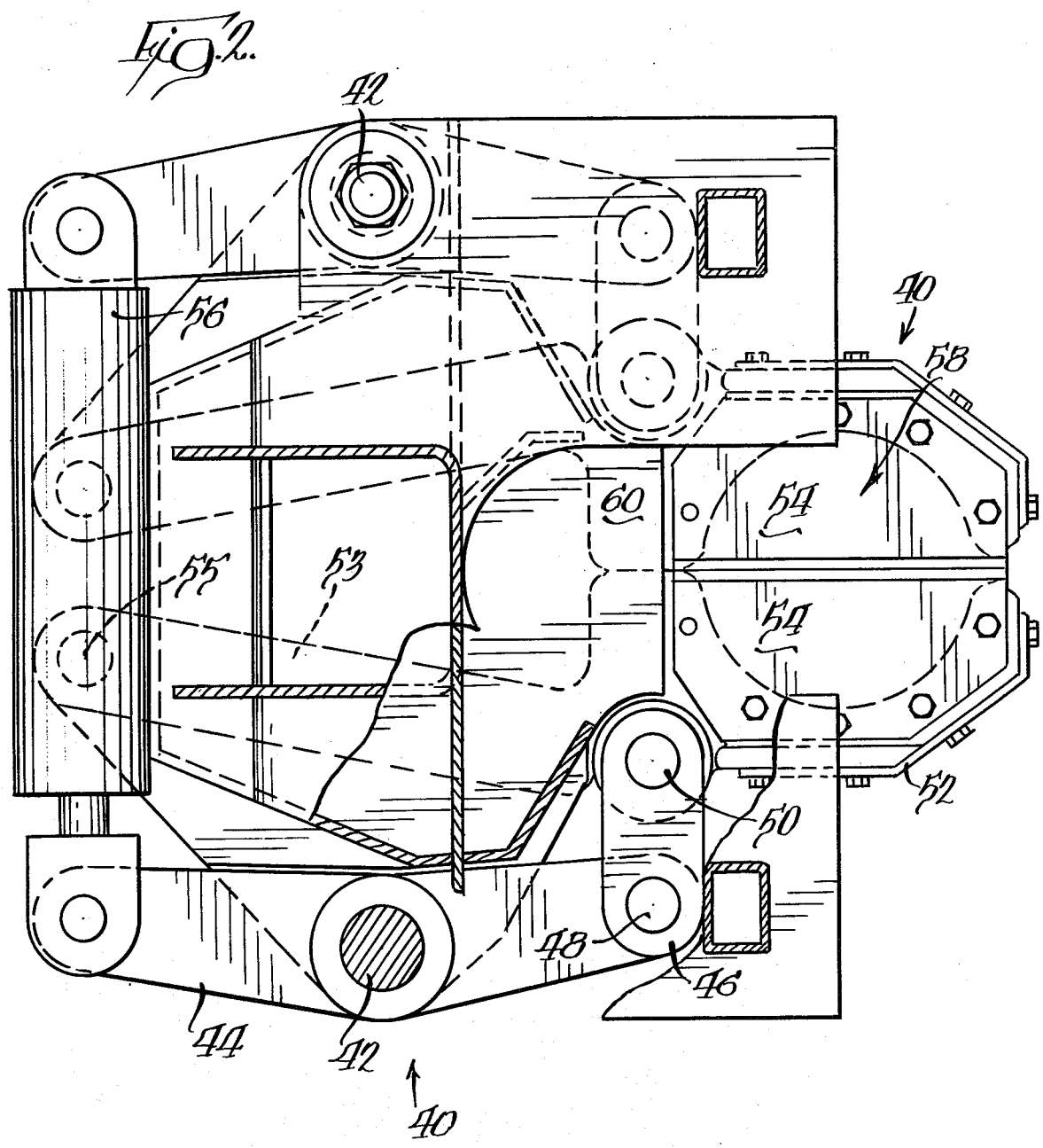

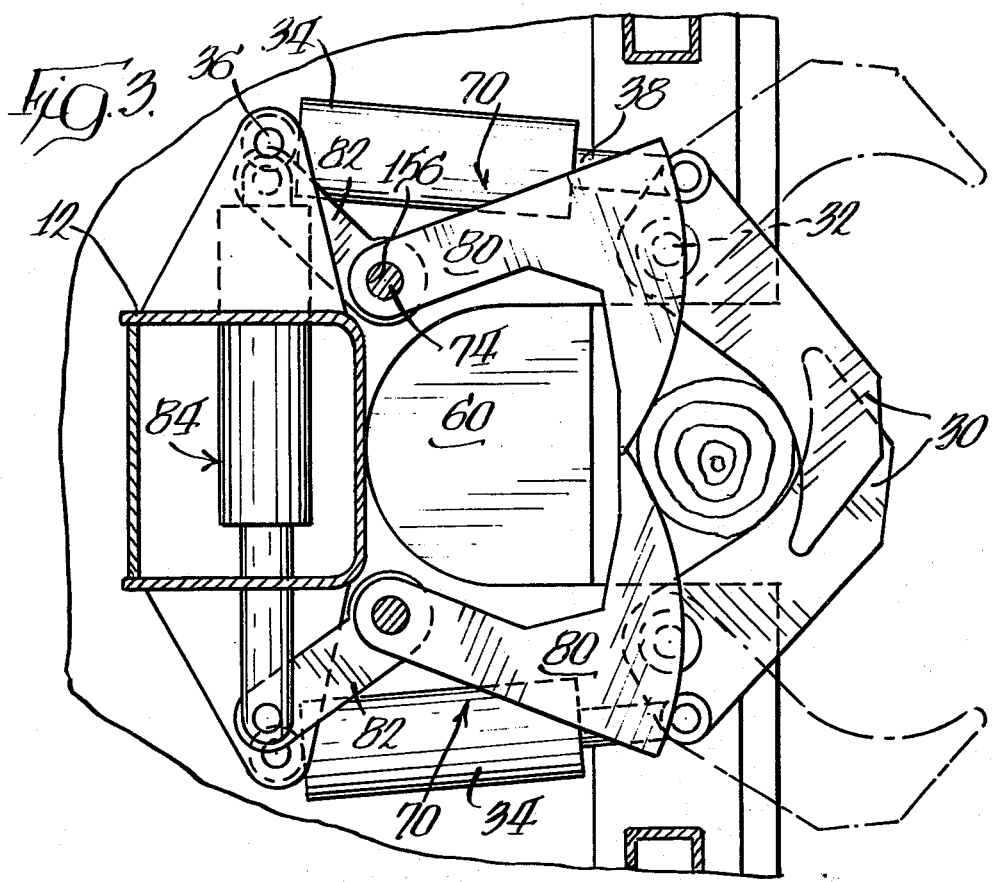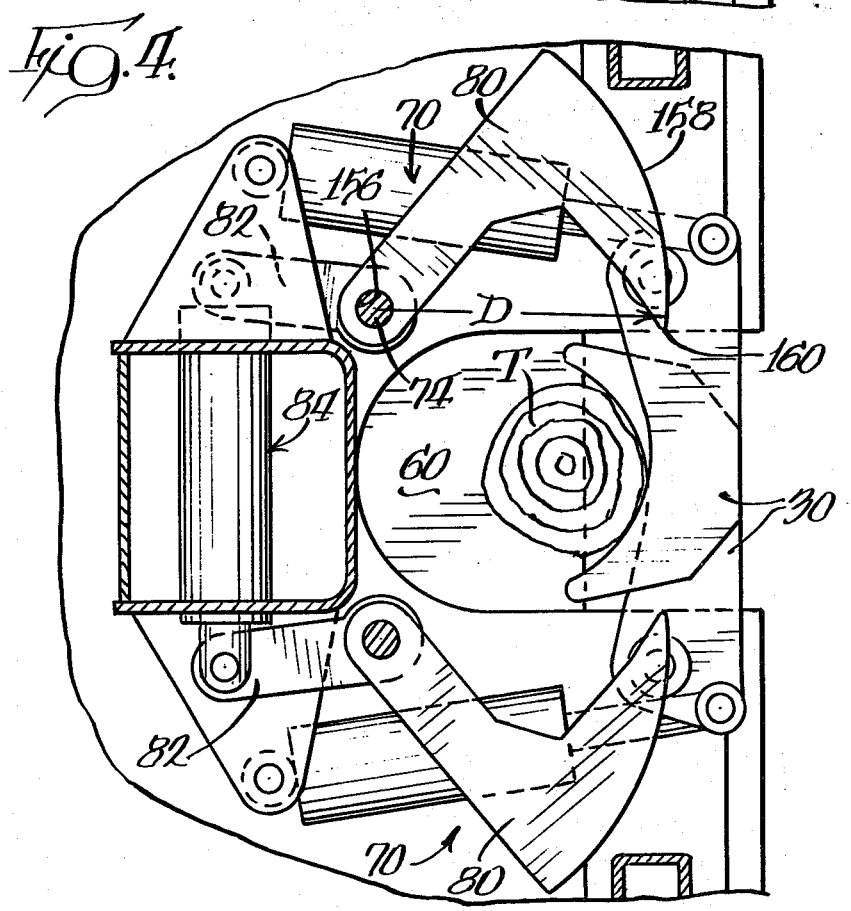

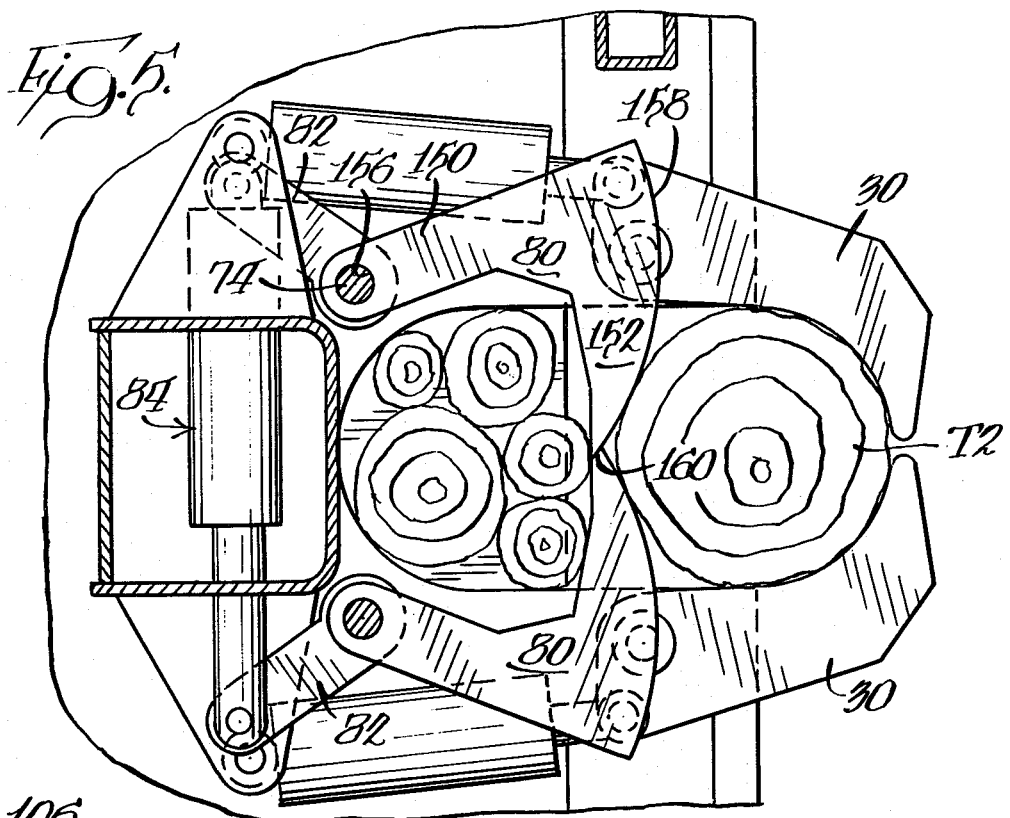
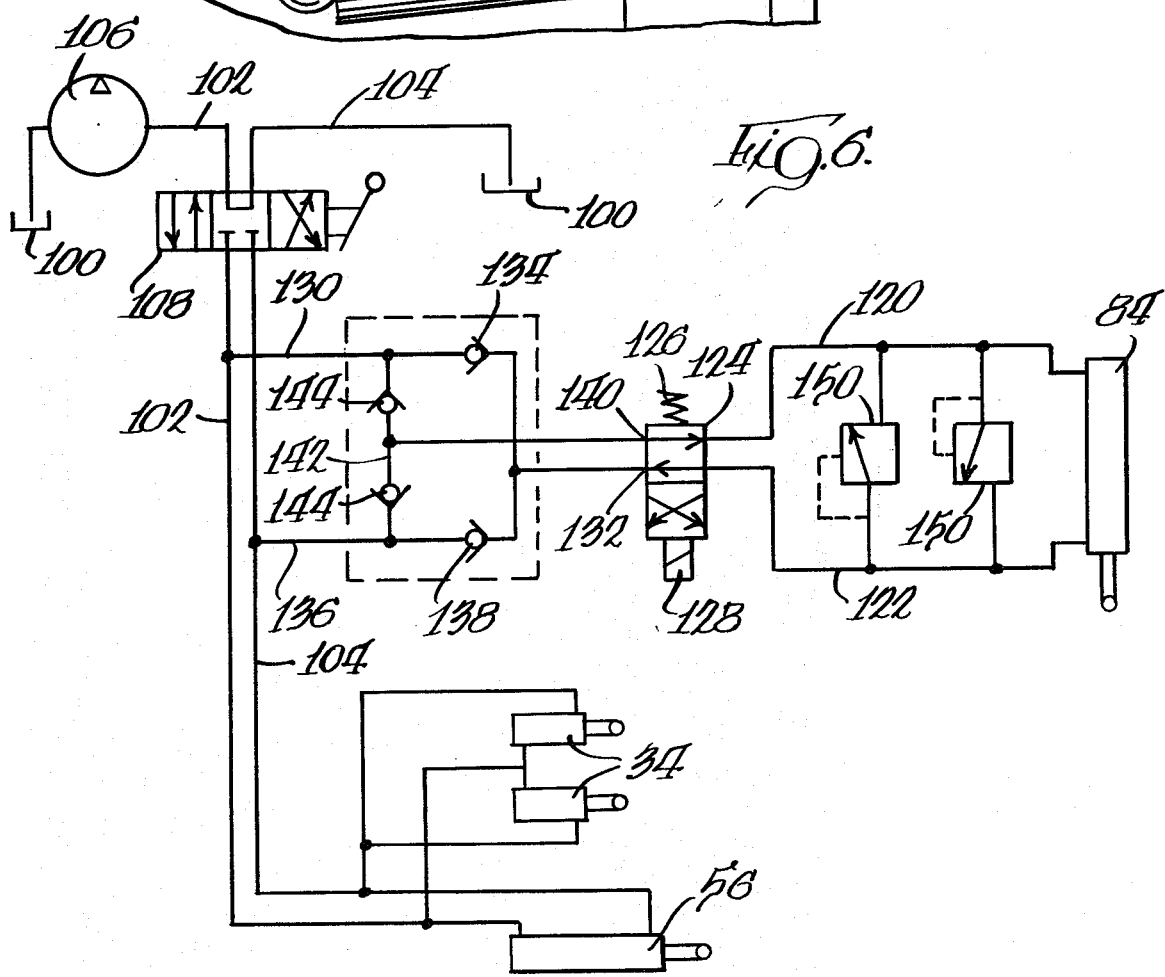

APPARATUS FOR FELLING AND ACCUMULATING TREES

BACKGROUND OF THE INVENTION

In recent years, mechanical tree harvesters have virtually obsoleted manual harvesting of trees. Many tree harvesting machines are now available from various manufacturers. Usually a tree harvester consists of a harvesting head that is adapted to be mounted on a vehicle and the harvesting head has gripping means for gripping a growing tree and holding the tree while it is severed. Usually these harvesting heads are attached to some type of boom and can be manipulated so that the harvested tree can be placed on the ground in a predetermined oriented position, usually in a stack with other trees.

The rising cost of mechanical harvesters and the decreasing size of trees being harvested has made it desirable to be able to cut several smaller trees and accumulate them on the harvesting head so that a plurality of trees can be harvested before they are stacked since the stacking operation requires substantial manipulation which decreases the productivity of the machine.

One type of mechanical harvester for trees is disclosed in Coffey U.S. Pat. No. 3,664,391. This patent discloses a harvester head which is capable of being universally moved about the end of a boom and has a plurality of grapple assemblies and an accumulator assembly supported thereon. A similar type of tree harvesting apparatus is disclosed in Smith U.S. Pat. No. 3,805,860.

While these types of units have been successful for cutting and accumulating trees when the size of the trees is significantly smaller than the maximum size tree which the felling head is capable of cutting, these units are not capable of cutting more than one tree and accumulating trees at or near the maximum size tree for the felling head. Thus, when trees approaching the maximum size for the felling head is being harvested, each individual tree must be removed from the feller head before a subsequent tree can be harvested.

Other attempts have been made to design feller-buncher heads which are capable of severing and accumulating larger trees, approaching the maximum size for the feller-buncher head. Examples of such apparatus are disclosed in Larson et al. U.S. Pat. No. 3,468,352 and Hamilton U.S. Pat. No. 3,749,143. While these units are designed to be capable of cutting and accumulating several trees on the accumulator head, the designs have an inherent shortcoming which has limited the acceptability of such units. The devices disclosed in the two patents have the inherent disadvantage of not having a positive gripping action on the tree while it is being severed. In both types of units disclosed in these patents, the gripping force on the growing tree relies upon a resilient member which defines part of the gripping force thereby minimizing the control which the operator has over the gripping force on the tree as it is being severed.

SUMMARY OF THE INVENTION

According to the present invention, a tree harvesting head is capable of cutting and accumulating a plurality of trees approaching the maximum size tree that is capable of being cut by the felling head while still maintaining positive gripping control on each individual tree while it is being severed and holding the remaining trees in the accumulator area.

According to the method aspect of this invention, a tree cutting apparatus having an accumulator area, accumulator arms and grapple arms with a cutter mechanism spaced from the grapple arms is capable of gripping the growing tree between the accumulator arms and the grapple arms and severing the tree at the base with the cutter mechanism while being gripped between the accumulator arms and the grapple arms. The accumulator arms are then opened and the grapple arms automatically move the severed tree into the accumulator whereupon the accumulator arms can be closed to hold the severed tree in the accumulator and condition the head for gripping a subsequent tree and severing it.

The apparatus of the present invention consists of a frame having a cutter supported thereon in a cutting area with an accumulator area located between the cutting area and the base of the frame. Accumulator arm means are supported on the frame and are moved between open and closed positions for opening and closing the entrance to the accumulator area and grapple arm means are also pivoted between open and closed positions so that a growing tree can be positively gripped between the accumulator arm means and the grapple arm means and severed whereupon the accumulator arm means can be opened to allow the grapple arms to move the severed tree into the accumulator area. In its specific embodiment, the accumulator arm means consists of first and second pairs of vertically spaced arms pivoted on the frame through a single fluid ram and a pair of grapple arms respectively located between the accumulator arms. The accumulator arms of each pair are respectively pivoted on opposite sides of the accumulator area and have arcuate peripheral surfaces that terminate in adjacent tips which are overlapped when the pair of accumulator arms are in a closed position to define a tree receiving cradle.

According to one specific aspect of the present invention, the arcuate peripheral surfaces are generated such that the dimension between the tip and the pivot axis for each arm is the minimum dimension of the peripheral surface with respect to the pivot axis. The unique feature resulting from such configuration is that as the arm opens, the radius to the point of contact with the tree is continually decreasing thereby reducing friction between the tree and the outer peripheral profile of the arm during the opening movement of the arm. This arrangement reduces the friction between the tree and the arm and permits the arm to be moved to an open position with less force.

BRIEF DESCRIPTION OF THE SEVERAL VIEWS OF THE DRAWINGS

FIG. 1 of the drawings discloses a tree harvesting head having the present invention incorporated therein;

FIG. 2 is an enlarged sectional view as viewed along line 2—2 of FIG. 1;

FIG. 3 is a fragmentary sectional view as viewed along line 3—3 of FIG. 1;

FIG. 4 is a view similar to FIG. 3 showing the position of the apparatus as a first severed tree is moved into the accumulator area;

FIG. 5 is a view similar to FIG. 4 showing a plurality of trees in the accumulator area and a tree of maximum size in position to be severed; and FIG. 6 is a schematic of the hydraulic circuit for the tree harvester head.

DETAILED DESCRIPTION

While this invention is susceptible of embodiment in many different forms, there is shown in the drawings and will herein be described in detail a preferred embodiment of the invention with the understanding that the present disclosure is to be considered as an exemplification of the principles of the invention and is not intended to limit the invention to the embodiment illustrated.

FIG. 1 of the drawings discloses a tree harvesting head, generally designated by reference numeral 10 which includes a rigid support or frame 12 that is adapted to be pivoted on a pivot pin 14 on the outer end of a boom 16 which forms part of a vehicle such as that disclosed in U.S. Pat. No. 3,575,222. Frame 12 is adapted to be pivoted about pivot pin 14 through a fluid ram means 18, only a portion of which is shown in FIG. 1.

Tree harvesting head or feller-buncher 10 includes upper and lower grab arm assemblies 20 and 22 and a lower tree engaging and shearing assembly, generally designated by reference numeral 24. Grab arm assemblies 20 and 22 are substantially identical in construction and define grapple means for grasping and holding a standing tree while it is being severed by shearing or cutting assembly 24. Each grap arm assembly includes a grapple arm 30 (FIG. 3) pivoted by pivot pin 32 on frame 12 and movable between open and closed positions through a hydraulic fluid ram means 34 which has one end pivoted on pin 36 located on frame 12 and the opposite end pivoted through pin 38 on grapple arm 30.

Cutter assembly 24 is most clearly illustrated in FIGS. 1 and 2 and includes a pair of cutter blade assemblies 40 respectively pivoted on frame 12. Each blade assembly 40 consists of a bell crank or link 44 pivoted intermediate opposite ends on pin 42 with a drive link 46 secured to one end through a bolt 48. The opposite end of link 46 is pivotally connected through pin 50 to a blade support assembly 52 that has a shear blade 54 mounted thereon. Blade support assembly 52 has an arm 53 which is pivoted on frame 12 at the base thereof through a pin 55.

The opposite ends of bell cranks 44 have a single hydraulic fluid ram 56 connected thereto so that extension and retraction of fluid ram 56 will pivot the respective blade assemblies 40 about pivot pins 42 and 55 between open and closed positions. The blades 54 and adjacent frame structure, to be described later, define a tree cutting area 58 which is spaced from the base of frame 12 and has a center C (FIG. 1).

A flat horizontal plate 60 extends rearwardly of the rear edges of blades 54 and has an upper surface generally vertically aligned with the upper surfaces of blades 54 as most clearly illustrated in FIG. 1. Plate 60 defines an accumulator area which is located between cutting area 58 and the base 62 of frame 12.

The accumulator arm means are most clearly illustrated in FIGS. 1 and 3 and consist of first and second accumulator assemblies 70 respectively pivoted on frame 12 on opposite sides of the accumulator area 60. Each accumulator arm means includes a sleeve 72 which is pivotally supported on an elongated bolt or pin 74 which extends between a pair of fixed plates 76 that form part of frame 12. An accumulator arm 80 is fixedly secured to each end of sleeve 72 and each sleeve 72 also has a rigid link 82 secured to an intermediate portion thereof. A fluid ram 84 is interposed between the free ends of links 82 so that extension and retraction of fluid ram 84 will pivot accumulator arms 80 between open and closed positions respectively illustrated in FIGS. 4 and 5.

Before describing the operation of the unique tree harvester head 10, a brief description of the hydraulic circuit for supplying fluid to the respective fluid rams appears to be in order. The hydraulic circuit, which is illustrated in FIG. 6, is substantially identical to the hydraulic circuit disclosed in Tucek U.S. Pat. No. 3,910,326, the portions of which are consistent with this disclosure being incorporated herein by reference. However, for purposes of completeness, the details of the hydraulic circuit will now be described. The hydraulic circuit includes a reservoir 100 with first and second conduits 102 and 104 leading from reservoir 100 to the opposite ends of hydraulic fluid rams 34 and 56. A pump 106 is located in one of the conduits 102 while a main control valve 108 is located in both conduits 102 and 104, which define conduit means between reservoir 100, pressurized fluid source 106 and fluid rams 34 and 56. Valve 108 is a manually actuated three-position valve which has a first position that blocks flow to and from fluid rams 34 and 56, a second position wherein pump 106 is connected to the head ends of fluid rams 34 and 56 and a third position wherein the pump or pressurized fluid source is connected to the rod ends of fluid rams 34 and 56.

With the arrangement so far described, all three fluid rams 34 and 56 are simultaneously extended and retracted. Thus, initial pressurized fluid into conduit 102 will pressurize the head ends of fluid rams 34 and 56 to simultaneously cause grapple arms 30 to be moved to a closed gripping position and also will cause cutter blades to move towards a closed position illustrated in FIG. 2. However, since the resistance to movement of cutter blades 54 is the greatest, the first action which will occur will be that grapple arms 30 will be moved to a closed position to positively grip the growing tree between closed accumulator arms 80 and grapple arms 30. As the pressure of the fluid from pump 106 increases, the shear blades will ultimately move to a closed position and sever the tree from the base thereof.

The hydraulic circuit also includes means for supplying hydraulic fluid to opposite ends of accumulator fluid ram means 84 when main control valve 108 is in either of its operative positions. For this purpose, branch conduits 120 and 122 lead from a solenoid operated valve 124 to opposite ends of fluid ram 84. Remotely controlled solenoid valve 124 is normally biased to a first position illustrated in FIG. 6 through spring means 126 and is capable of being moved to a second position through an electrically actuated solenoid 128.

Main conduits 102 and 104 are respectively connected to two ports of solenoid valve means 124 so that pressurized fluid from either conduit is directed to one port while the opposite port is at all times connected to the unpressurized main conduit 102 or 104. For this purpose, a first conduit 130 leads from main conduit 102 to port 132 with a unidirectional valve means 134 located therein preventing flow from conduit 102 to valve 124. Likewise, conduit 104 is connected to port 132 through a branch conduit 136 also having a unidirectional valve 138. Both conduits are also connected to a second port 140 through a further branch conduit 142 having unidirectional valves 144 and 146 therein.

Thus, with solenoid valve means 124 in the position illustrated in the drawings, when either of the conduits 102 or 104 is pressurized, the pressurized fluid will flow through either valve 146 or 144 to port 140 of valve 124 and to the head end of fluid ram 84 to move the fluid ram to an extended position which moves the accumulator arms to a closed position. The pressurized fluid which is being forced from the rod end of fluid ram 84 through conduit 122 will then be returned to the reservoir through the lower pressure main line 102 or 104 through either unidirectional valve 134 or 138.

Of course, if solenoid 128 is energized, the valve will move to a second position and the fluid flow to and from fluid ram 84 will be reversed to open accumulator arms 80. If desired, suitable high pressure relief valves 150 may be located between conduits 120 and 122 to maintain the pressure below a predetermined level.

Considering now the operation of the overall apparatus so far described, solenoid valve means 124 is normally in the position illustrated in FIG. 6 wherein the head end of fluid ram 84 will be connected to either pressurized main conduit 102 or 104. Thus, when either main conduit 102 or 104 is pressurized, accumulator arms 80 will be moved to the closed position illustrated in FIG. 5 and will remain in such closed position unless solenoid valve 124 is reversed. In this condition, and with grapple arms 30 in an open position illustrated in dotted lines in FIG. 3, a growing tree T my be manipulated into position as illustrated in FIG. 3 by manipulation of felling head 10 so that the tree is in engagement with the peripheral surfaces of accumulator arms 80. The position of valve 108 will then be reversed to supply pressurized fluid to the head ends of fluid rams 34 and 56 which will cause grapple arms 30 to move from the open to the closed, solid-line position illustrated in FIG. 3 to securely grip the tree between accumulator arms 80 and grapple arms 30. Subsequently, the higher pressurized fluid from pump 106 will extend fluid ram 56 and will sever the tree at the base thereof. After the tree has been severed, solenoid 128 of solenoid valve 124 is temporarily energized which will provide pressurized fluid to the head end of fluid ram 84 to cause accumulator arms 80 to move to the open position illustrated in FIG. 4. Since pressurized fluid is still being supplied to head ends of fluid rams 34, the fluid rams will continue pivotal movement of grapple arms 30 from the position illustrated in FIG. 3 to that illustrated in FIG. 4 and will automatically move the severed tree T from the cutting area illustrated in FIG. 3 to the accumulator area illustrated in FIG. 4. After grapple arms 30 are in the position illustrated in FIG. 4 wherein the tree T is in the accumulator area, solenoid 128 is deenergized which will cause the accumulator arms to move to a closed position and will retain tree T in the accumulator area. Valve 108 can then be reversed and grapple arms 30 as well as cutter blades 54 will be moved to a open position wherein the process can be repeated. Of course, while a subsequent tree is being manipulated into position in the cutting area, accumulator arms 80 will close the entrance area to the accumulator area and prevent trees from falling out of the accumulator area. When the accumulator area has been filled, as indicated in FIG. 5, a maximum size tree T2 can be positioned into the cutting area and can be severed in the same manner as described above. After the last tree, which can be of the maximum size designed for the cutting head, all of the trees can be simultaneously manipulated to a horizontal position and deposited on the ground in a group for subsequent pick-up and transportation.

According to another aspect of the invention, each accumulator arm has a specific configuration which reduces the amount of friction that is developed when the accumulator arm is moved from the closed to the open position while in engagement with a tree that has just been severed.

As most clearly illustrated in FIG. 5, each accumulator arm 80 has a generally L-shaped main body which defines first and second legs 150 and 152. The included area between the legs 150 and 152 defines an open space and a pair of arms cooperate to define a gripping member for trees located in the accumulator area. Leg 150 has an opening 156 at a free end thereof which defines a pivot axis for the accumulator arm 80. The second leg 152 has an arcuate peripheral surface 158 which terminates in a tip 160 at the outer free end of the other leg 152. The tip of peripheral surface 158 of arm 80 is spaced from opening 156 by a dimension D illustrated in FIG. 4. This dimension D defines the minimum spacing between opening 156 and arcuate surface 158 throughout the length thereof. Preferably, the dimension D from tip 160 to the opposite end of arcuate surface 158 progressively increases by a small amount. Thus, when the accumulator arms are moved from the closed position illustrated in FIG. 5 for example, to an open position, the radius from the point of contact of peripheral surface 158 to opening 156 constantly decreases thereby reducing the friction between the tree and the outer peripheral surface of the arm which aids in getting the accumulator arms 80 to an open position to allow grapple arms 30 to move the severed tree into the accumulator area.

By way of an example, and not of limitation, the radius of arcuate surface 158 could be equal to the dimension D and the center of this radius could be offset from the center of opening 156 away from the accumulator area to produce the constantly decreasing radius of surface 158 with respect to pivot opening 156. Alternatively, the radius could be slightly smaller and offset by a greater distance from opening 156 to produce the same results. Of course, the radius of surface 158 could also be equal to dimension D if desired.

Summarizing the above invention, the feller-buncher head is capable of severing a plurality of trees, all of which could be of the size equal to the maximum size that the feller head is capable of cutting and could be accumulated. During the severing of each tree, the tree is positively gripped between the accumulator arms and the grapple arms to prevent any undesired movement of the tree during the severing operation.

What is claimed is:

1. A tree harvester head for cutting and accumulating trees comprising a frame having a cutter supported thereon in a cutting area and an accumulator area above said cutter located between a base of said frame and the cutting area, means for actuating said cutter, accumulator arm means on said frame for holding trees in the accumulator area, drive means for moving said accumulator arm means between open and closed positions respectively opening and closing the accumulator area, said accumulator arm means including first and second arms respectively pivoted on first and second pivot axes on said frame on opposite sides of said accumulator area, said arms having arcuate peripheral surfaces respectively spaced from said pivot axes which terminate in tips having a predetermined dimension from said pivot axes and in which said predetermined dimension for each arm defines a minimum spacing between each arcuate surface and its associated pivot axis, grapple arms pivoted on said frame, said grapple arms extending away from said frame and having free ends spaced from said accumulator arm means, and pivoting means for pivoting said grapple arms to positively grip a growing tree between said accumulator arm means and grapple arms with said accumulator arm means in a closed position to retain accumulated trees in the accumulator area and said accumulator arm means being movable to an open position after the growing tree is severed to allow said grapple arms to move said tree into the accumulator area.

2. A tree harvester head as defined in claim 1, further including a second pair of first and second arms as defined in claim 1 with the grapple arms located between the pairs of arms.

3. A tree harvester head as defined in claim 1, in which said tips are overlapped in said closed position for said accumulator arm means and said arcuate peripheral surfaces cooperate to define a tree receiving cradle.

4. A tree harvester head as defined in claim 2, in which said drive means includes first and second linkage means respectively connected to said first arms and said second arms and a single fluid ram interposed between said first and second linkage means.

5. A tree harvester head for cutting and accumulating trees comprising a frame having a cutter supported thereon in a cutting area and an accumulator area above said cutter located between a base of said frame and the cutting area, means for actuating said cutter, said accumulator area including a flat plate between said base and said cutter area to support a plurality of trees, accumulator arm means on said frame for holding trees in the accumulator area, drive means for moving said accumulator arm means between open and closed positions respectively opening and closing the accumulator area, grapple arms pivoted on said frame, said grapple arms extending away from said frame and having free ends spaced from said accumulator arm means, and pivoting means for pivoting said grapple arms to positively grip a growing tree between said accumulator arm means and grapple arms with said accumulator arm means in a closed position to retain accumulated trees in the accumulator area and said accumulator arm means being movable to an open position after the growing tree is severed to allow said grapple arms to move said tree into the accumulator area.

6. An accumulator arm for use as part of tree harvester and accumulator apparatus comprising a generally L-shaped main body having two legs with an opening defining a pivot axis for said arm adjacent a free end of one leg, the other leg having an arcuate peripheral surface terminating in a tip at the free end of the other leg, said tip being spaced from said opening by a predetermined dimension with said predetermined dimension defining a minimum spacing for said arcuate surface with respect to said opening.

* * * * *